United States Patent [19]

Ishihara et al.

[11] Patent Number: 4,947,403

[45] Date of Patent: Aug. 7, 1990

[54] GAS LASER TUBE HAVING A SUPPORTED CATHODE

[75] Inventors: Hiroyuki Ishihara; Makoto Kinoshita, both of Tokyo, Japan

[73] Assignee: NEC Corporation, Japan

[21] Appl. No.: 374,298

[22] Filed: Jun. 30, 1989

[30] Foreign Application Priority Data

Jun. 30, 1988 [JP] Japan .............................. 63-87422[U]
Dec. 13, 1988 [JP] Japan ............................ 63-161927[U]

[51] Int. Cl.$^5$ .......................... H01S 3/097; H01S 3/03
[52] U.S. Cl. ....................................... 372/87; 372/61; 372/65; 372/88
[58] Field of Search ........................ 372/61, 65, 87, 88

[56] References Cited

U.S. PATENT DOCUMENTS

| 3,784,927 | 1/1974 | Rudolph | 372/65 |
| 4,081,762 | 3/1978 | Golser et al. | 372/65 |
| 4,203,080 | 5/1980 | Wright et al. | 372/65 |
| 4,352,185 | 9/1982 | Crane | 372/29 |
| 4,553,240 | 11/1985 | Schmid | 372/65 |
| 4,644,554 | 2/1987 | Sheng | 372/65 |
| 4,823,356 | 4/1989 | Riley | 372/65 |

Primary Examiner—William L. Sikes
Assistant Examiner—Georgia Y. Epps
Attorney, Agent, or Firm—Leydig, Voit & Mayer

[57] ABSTRACT

A hollow metal member which holds a mirror of an optical resonator in a gas laser tube is electrically and mechanically connected with a hollow cathode by a spring. The spring is positioned either outside or on the inner surface of the hollow metal member and elastically forces one end of the cathode against the inner wall of the hollow metal member.

14 Claims, 4 Drawing Sheets

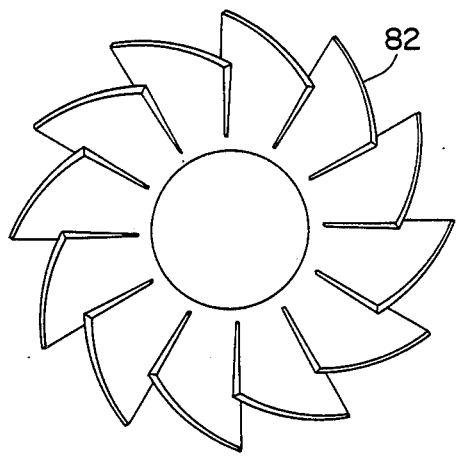
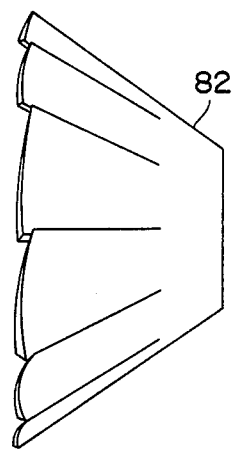
FIG. 7A  FIG. 7B
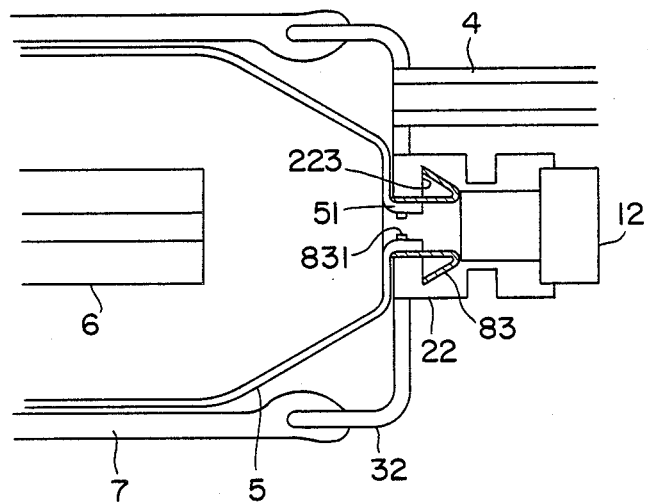
FIG. 8

GAS LASER TUBE HAVING A SUPPORTED CATHODE

BACKGROUND OF THE INVENTION

This invention relates to a gas laser tube, and more particularly to a structure for holding and fixing a cathode thereof.

A gas laser tube such as helium neon gas laser tube utilizes an aluminum cold cathode. This is usually of cylindrical shape and longitudinally overlaps within a glass envelope a capillary discharge tube. In U.S. Pat. No. 4,311,969, a cylindrically shaped aluminum cathode has an extending cylindrical snout receivable within a central opening of a nickel-iron alloy end plate for an envelope. The end plate is designed with a central axially extending neck section defining the central opening. The axial length of the snout of the cathode is greater than the axial length of the opening in the neck section of the end plate so that the end of the snout can be peened over the neck section to effect both electrical contact by way of the end plate and at the same time be properly mechanically supported.

However, the difference in thermal expansion coefficient between the aluminium and nickel-iron alloy affects the reliability for electrical connection therebetween. Temperature changes occur when an optical resonator mirror is sealed in a mirror holder with low-melting glass, or when the whole laser tube is baked in an oven in order to exhaust gas from the envelope.

Aluminum has a thermal expansion coefficient of more than three times higher than that of the nickel-iron alloy. For example, the thermal expansion coefficient of a so-called 426 alloy is $90 \times 10^{-7}/C.°$ at $30° \sim 380°$ C., while the thermal expansion coefficient of Al is $29 \times 10^{-6}/C.°$ at $0° \sim 600°$ C. When heated to a high temperature an, aluminum cathode therefore tends to expand outward, but because the end plate does not expand as much as the cathode, an internal force is exerted on the contact point. As aluminum is much softer than the 426 alloy, the point on which the force is exerted is apparently deformed in the inward direction compared to other locations where no force is exerted. When the temperature falls from this state to the normal operating temperature (several tens of degrees centigrade), the cathode is compressed remarkably toward the inside, and the alignment between the cathode and the internal surface of the end plate is degraded.

As mentioned above, the cathode fixing structure is unsatisfactory in that thermal hysteresis weakens the alignment and electric contact of the cathode, and if the tube is subjected to vibrations or shocks, electric discharge is instantaneously suspended.

SUMMARY OF THE INVENTION

This invention was conceived to eliminate such problems encountered in the prior art, and aims at providing a gas laser tube which is not prone to thermal hysteresis in the fixing structure of the cathode and has a high resistance against vibration and shock. In order to achieve this object, this invention provides a gas laser tube which comprises a first hollow metal member retaining a first mirror at one end thereof, a cathode member having one end thereof inserted into an opening on the other end of the first hollow metal member and supported therewith, an electrically conductive spring member which electrically as well as mechanically connects the cathode member with the first hollow metal member, a capillary discharge tube having one end arranged inside an opening formed at the other end of the cathode member, an outer housing which houses the discharge tube and the cathode member, and a second hollow metal member provided on the outer housing at the other end of the discharge tube which supports and fixes a second mirror which forms an optical resonator together with the first mirror.

BRIEF DESCRIPTION OF THE DRAWINGS

FIG. 7A is a plan view of the metal member 82 in FIG. 5;

FIG. 7B is a side view of the metal member 82 in FIG. 7A; and

FIG. 8 is a sectional view of a partion of a fourth embodiment of a gas laser tube according to this invention.

DESCRIPTION OF THE PREFERRED EMBODIMENTS

Figure 1:
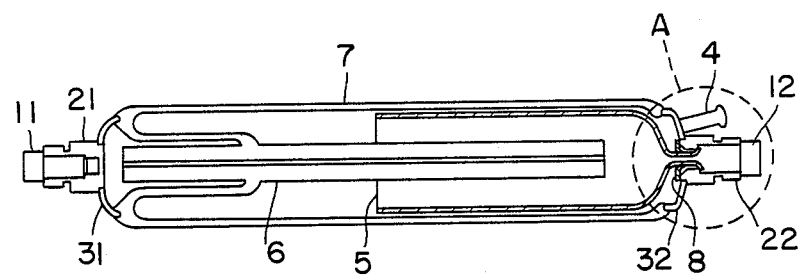
FIG. 1 is a sectional view of a first embodiment of a gas laser tube according to this invention.
Figure 2:
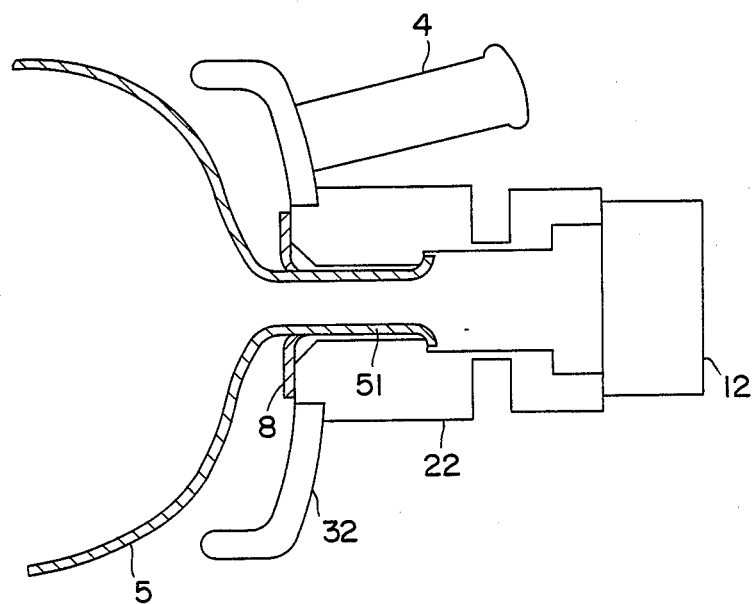
FIG. 2 is an enlarged view of FIG. 1 showing details of section A in FIG. 1.
Figure 3A:
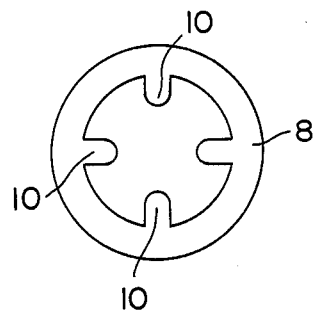
FIG. 3A is a plane view showing a metal member 8 according to this invention.
Figure 3B:
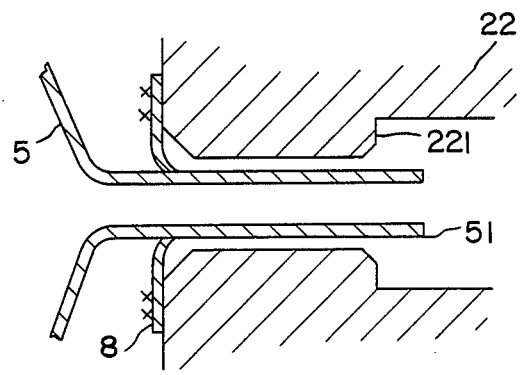
FIGS. 3B and 3C are sectional views illustrating the supporting/fixing process of the cathode with the metal member 8 in FIG. 3A.
Figure 3C:
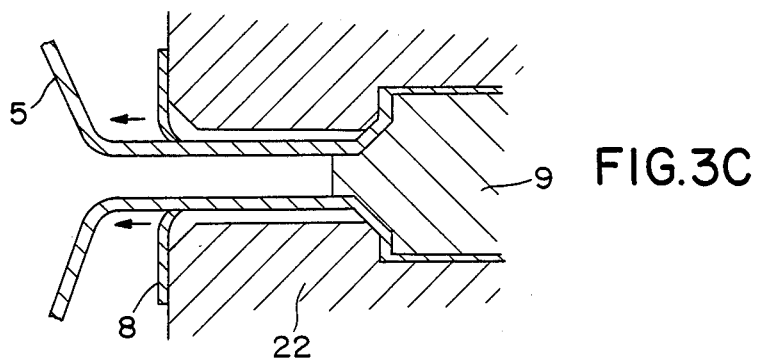

FIGS. 1 through 3 illustrate a first embodiment of the present invention. As shown in these Figures, a pair of mirrors 11, 12 for an optical resonator are respectively fixed and supported by hollow metal supporting members 21, 22 which are attached to both ends of a glass bulb 7 via end plates or metal sealing dishes 31, 32. The glass bulb 7 is part of an outer housing. A cylindrically shaped aluminum cathode 5 is open at one end and largely closed at its other end. A metal evacuation pipe 4 is soldered on the metal dish 32 while an extending cylindrical snout 51 of the hollow aluminum cathode 5 is fixed onto supporting part 22 which is made of a nickel-iron alloy. A funnel-shaped portion of the cathode 5 connects the snout 51 to the cylindrical body of the cathode 5, which has a larger diameter than the snout 51. A capillary discharge tube 6 is secured at one end thereof to the glass bulb 7. A metal member 8 which is a spring made of stainless steel sheet is shaped like a ring having multiple projections 10 on the internal circumference thereof as shown in FIG. 3A and is secured to the metal supporting member 22. Reference numeral 9 in FIG. 3C denotes a press jig which forces the snout 51 of the aluminum cathode 5 onto the inner surface of the metal supporting member 22.

The cathode 5 is contacted tightly with the metal supporting member 22 by the following process. As shown in FIG. 3B, the snout 51 of the aluminum cathode 5 is inserted into openings of the metal member 8 and the metal supporting member 22. The metal member 8 is attached in advance by spot welding at the locations marked X to the metal supporting member 22 on an end surface close to the cathode.

Then, a press jig 9 is forced in as shown in FIG. 3C, and the tip end of the aluminum cathode 5 is forced to deform to accommodate to the shape of the tip of the jig 9 so as to cause the cathode 5 and an inner wall of the member 22 to contact tightly and snugly with each other.

The aluminum cathode 5 is pulled in the direction of the arrows in FIG. 3C by the spring force of member 8 to tightly fit the cathode 5 against the supporting member at a step portion 221. As the cathode 5 is made of aluminum is and softer than member 8, which is made of stainless steel, the projections 10 of member 8 and the aluminum cathode 5 are engaged sufficiently to prevent rotational deviation from each other. Therefore, even if subjected to thermal hysteresis, the close contact of the aluminum cathode is hardly deteriorated, and the electric connection between the aluminum cathode 5 and the metal supporting member 22 is made secure.

Figure 4:
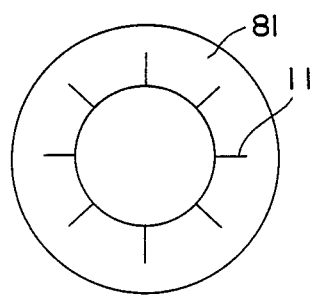
FIG. 4 is a plane view of a second embodiment of the metal member according to this invention.

The metal member 8 need not have projections, and as shown in FIG. 4, it may be an annular metal member 81 having an inner diaqmeter which is smaller than the outer diameter of the cathode end and having an inner circumference which is cut to form a number of slits or notches.

The aforementioned embodiments of this invention effectively enhance the reliability of the gas laser tube as it can maintain an electric connection between the metal supporting members and the cathode as well as secure the cathode thereto even after thermal changes by fitting an annular metal member having multiple projections on the inner circumference thereof with a metal supporting member attached on an end surface closer to the cathode and fixing and supporting the aluminum cathode by means of the spring force of the projections as well as the engagement between the soft aluminum cathode and the rigid projections.

Figure 5:
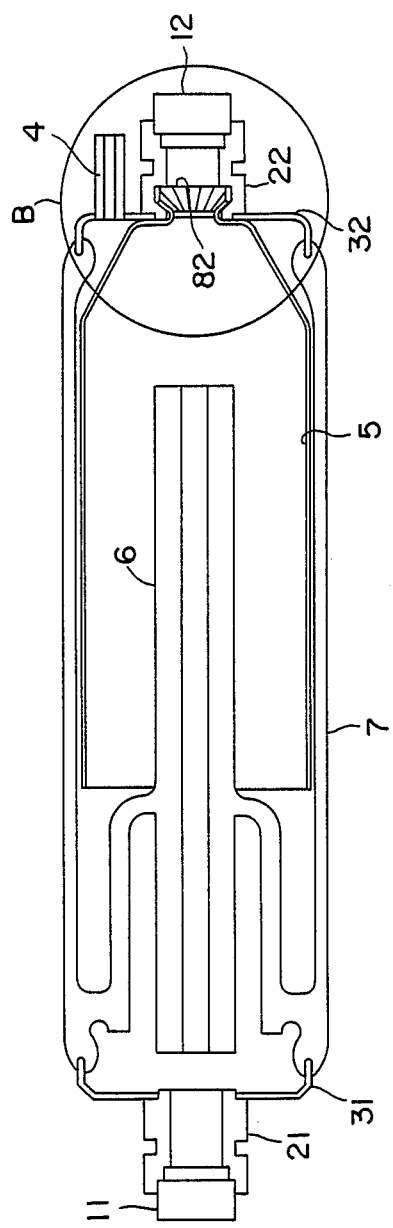
FIG. 5 is a cross-sectional view of a third embodiment of a gas laser tube according to this invention.
Figure 6:
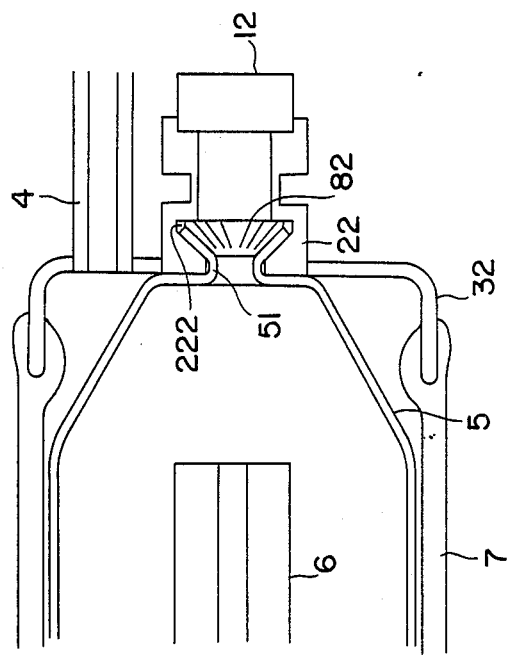
FIG. 6 is an enlargement of section B of FIG. 5.

FIGS. 5 to 7 show the third embodiment of this invention. In FIGS. 5 and 6 the same parts are denoted by the same reference numerals as in FIG. 1. As is obvious from FIGS. 5 and 6, a laser tube is assembled by inserting a snout 51 of an aluminum cathode 5 into a metal supporting member 22, and after a spring 82 is inserted into member 22 from outside (from the side of the mirror) and is press-fit into a groove inside member 22. The aluminum cathode 5 is deformed by the inserted spring 82 to tightly fit in the groove 222 formed inside member 22. An outward force is constantly applied to the area of contact due to the spring force of the spring 82.

If the spring 82 is made of a metal having a thermal expansion coefficient smaller than that of aluminum, e.g., spring steel, the electric as well as mechanical contact between the aluminum cathode 5 and the metal supporting member 22 can be maintained even after thermal changes.

FIG. 8 shows a fourth embodiment of this invention and the same parts are denoted by the same reference numerals as in FIG. 1. A spring 83 is mechanically fixed in advance on an aluminum cathode 5 by, for instance, inserting a pair of pins 831 of the spring 83 into a pair of holes 55 bored in a reduced end of the aluminum cathode 5. When the cathode 5 is inserted into the metal supporting 22 with the spring member fixed thereon, the spring 83 fits into a tapered groove 223 formed on the inner surface of the member 22. This embodiment is advantageous in that the form of the groove inside the metal supporting member 22 may be simpler.

As mentioned above, the present invention is highly effective in maintaining the mechanical of a cathode with a metal supporting member as well as electric connection therebetween by additionally providing a spring at one end of a cathode which tightly contacts the internal surface of the metal supporting member so as to force the cathode toward surface by the spring force.

The structure for fixing a cathode of a He-Ne laser tube according to this invention is particularly advantageous in that as the cathode is constantly pressed towarde the metal supporting members by the force of the spring member, the cathode will not be misaligned even after subjected to thermal changes in the manufacturing process of the gas laser tubes. If the spring member 8 is made of a metal having a smaller thermal expansion coefficient than that of aluminum, such as spring steel, even if tube is deformed due to the heat, the electric as well as mechanical contact between the aluminum cathode 5 and the metal supporting member 22 will be securely maintained and electric discharge will not be suspended even if the tube is subjected to vibration or shock.

What is claimed is:

1. A gas laser tube comprising a first hollow metal member having first and second ends and having a first mirror attached at the first end thereof, a cathode member having first and second ends, the first end of which is inserted and supported in an opening at the second end of said first hollow metal member, a conductive spring member connecting electrically as well as mechanically said first end of said cathode member with said first hollow metal member, a capillary discharge tube having first and second ends, the first end arranged in an opening at the second end of said cathode member, an outer housing containing said capillary discharge tube and said cathode member, and a second hollow metal member having a second mirror attached thereto and provided on said outer housing opposite the second end of said capillary discharge tube, said second mirror being arranged to form an optical resonator together with said first mirror.

2. The gas laser tube as claimed in claim 1, wherein said conductive spring member is formed like a ring, the periphery of the ring member is electrically as well as mechanically connected to the second end of said first hollow metal member, said ring member has spring like projections on the inner circumference thereof so as to be electrically as well as mechanically connected to the outer surface of said cathode member, and said cathode member is forced at one end thereof onto the inner wall of said first hollow metal member due to the spring force of the resilient projections exerted in the direction of said tube.

3. The gas laser tube as claimed in claim 1, wherein said spring member is in the form of a funnel with a center hole, and the outer periphery of said funnel-shaped member is cut to form plural slits so as to be compressed like a spring on the outer circumference when pressed into an opening formed at one end of said cathode member, thereby forcing said cathode member at one end thereof onto the inner wall of said first hollow metal member with the expanding force thereof.

4. The gas laser tube as claimed in claim 3, wherein a groove is formed on the inner surface of said first hollow metal member for positioning said spring member.

5. The gas laser tube as claimed in claim 1, wherein said spring member is a hollow cylinderical member having a first end connected electrically as well as mechanically with one end of said cathode member and a second end forced onto the inner wall of said first hollow metal member with a spring force expanding beyond the diameter of the opening at the second end of said first hollow metal member.

6. The gas laser tube as claimed in claim 5, wherein a groove is formed on the inner surface of said first hollow metal member for positioning said spring member.

7. A gas laser tube comprising:
   a housing having first and second ends, the first end including a hollow metal member having an inner surface;
   first and second mirrors positioned at the first and second ends of the housing to form an optical resonator;
   a discharge tube positioned within the housing;
   a cathode positioned within the housing around at least a portion of the discharge tube, the cathode including a connecting portion disposed inside the hollow metal member; and
   an electrically-conductive spring mechanically connected between the cathode and the hollow metal member.

8. The gas laser tube as claimed in claim 7 wherein the spring is annular, is electrically and mechanically connected to the hollow metal member, and has an elastic projection on the inner circumference thereof which is electrically and mechanically connected to the outer surface of the connecting portion of the cathode, the projection being elastically deformed to exert a force on the cathode in a direction to press the connecting portion of the cathode against the hollow metal member.

9. The gas laser tube as claimed in claim 7 wherein the spring is in the form of a funnel with a center hole and has an outer periphery in which a plurality of slits are formed, and wherein the spring is inserted into the connecting portion of the cathode and elastically presses the connecting portion outward against the inner surface of the hollow metal member.

10. The gas laser tube as claimed in claim 9, wherein the hollow metal member has a groove for positioning the spring formed in its inner surface.

11. The gas laser tube as claimed in claim 7 wherein the spring is a hollow cylindrical member having a first end electrically and mechanically connected with the connecting portion of the cathode member and a second end which elastically engages with the inner surface of the hollow metal member.

12. The gas laser tube as claimed in claim 11, wherein the hollow metal member has a depression formed in its inner surface with which the second end of the spring engages.

13. A gas laser tube comprising:
   a housing having first and second ends;
   a first hollow metal member disposed at the first end of the housing and having an inner surface with a step formed therein;
   a second hollow metal member disposed at the second end of the housing;
   first and second mirrors attached to the first and second hollow metal members, respectively, to form an optical resonator;
   a discharge tube extending inside the housing between the first and second hollow metal members;
   a hollow cathode disposed inside the housing surrounding at least a portion of the discharge tube, the cathode including a first cylindrical portion, a second cylindrical portion coaxial with the first cylindrical portion and having a smaller diameter than the first cylindrical portion, and a funnel portion which connects the first and second cylindrical portions, the second cylindrical portion having an end which engages with the step of the first hollow metal member; and
   an electrically-conductive spring which is secured to the first hollow metal member and is electrically and mechanically connected to the second cylindrical portion of the cathode.

14. A gas laser tube as claimed in claim 13 wherein the spring comprises a ring having a plurality of elastic projections formed on its inner circumference, the projecting being elastically deformed to exert a force on the cathode in a direction to press the prodtruding portion of the end of the second cylindrical portion of the cathode against the step in the first hollow metal member.

* * * * *